United States Patent [19]
Ezrielev et al.

[11] Patent Number: 5,476,792

[45] Date of Patent: Dec. 19, 1995

[54] TIME-TEMPERATURE INDICATOR DEVICES

[75] Inventors: Robert I. Ezrielev, Edison; Richard B. Barrett, Chatham, both of N.J.

[73] Assignee: Temple Division, Air Liquide America Corporation, South Plainfield, N.J.

[21] Appl. No.: 395,700

[22] Filed: Feb. 28, 1995

Related U.S. Application Data

[63] Continuation of Ser. No. 223,432, Apr. 5, 1994, abandoned.

[51] Int. Cl.$^6$ .................................................. G01K 11/06
[52] U.S. Cl. ............................... 436/1; 116/219; 422/56; 422/57; 374/102
[58] Field of Search .................. 436/1; 422/56, 422/57, 61; 116/216, 217, 219; 374/102, 106

[56] References Cited

U.S. PATENT DOCUMENTS

| | | | |
|---|---|---|---|
| 3,981,683 | 9/1976 | Larsson et al. | 422/57 |
| 4,038,873 | 8/1977 | Kimmel | 116/206 |
| 4,057,029 | 11/1977 | Seiter | 116/219 |
| 4,212,153 | 7/1980 | Kydonieus et al. | 116/216 |
| 4,423,005 | 12/1983 | Murtaugh | 422/61 |
| 4,448,548 | 5/1984 | Foley | 422/58 |
| 4,675,161 | 6/1987 | Hashimoto | 422/56 |
| 5,120,137 | 6/1992 | Ou-Yang | 116/219 |
| 5,152,611 | 10/1992 | Pieper et al. | 374/162 |
| 5,153,036 | 10/1992 | Sugisawa et al. | 116/216 |

*Primary Examiner*—James C. Housel
*Assistant Examiner*—Jan M. Ludlow
*Attorney, Agent, or Firm*—Burns, Doane, Swecker & Mathis

[57] ABSTRACT

A time-temperature indicator device for recording the duration of time over which a temperature has been established above a predetermined temperature, which device includes a dye-compatible polymer composition having a softening point above the predetermined temperature and a polymer-compatible dye composition in contact with the polymer composition and present in a quantity with respect to the polymer composition sufficient for diffusion through the polymer composition whenever the polymer composition is above the predetermined temperature, which quantity is selected so that the extent of diffusion corresponds to the duration of exposure above the predetermined temperature relative to the total time required for substantially complete diffusion. Articles for which a heat history above a predetermined temperature is to be record, in combination with the disclosed time-temperature indicator devices are also described. Methods for recording a duration of time over which a temperature has been established above a predetermined temperature utilizing the disclosed time-temperature indicator devices are also discussed.

27 Claims, 3 Drawing Sheets

TIME-TEMPERATURE INDICATOR DEVICES

This application is a continuation of application Ser. No. 08/223,432, filed Apr. 5, 1994 now abandoned.

BACKGROUND OF THE INVENTION

This invention relates to time-temperature indicator (TTI) devices for recording time-temperature relationships. In particular, the present invention describes TTI's that record the duration of exposure to a narrow temperature range, in excess of a predetermined temperature, by means of controlled diffusion of dye within a dye-compatible polymer composition. Differentiating the objects of this disclosure from the prior art is the fact that the time period being recorded far exceeds the time required for sterilization of materials by thermal means. Such a TTI fulfills a need in the design of a number of medical devices.

Medical devices historically fell into two distinct categories: (1) reusable and (2) disposable. The economic demands of modern medical practice have lead to devices that are too expensive to be immediately disposable but, nonetheless, have a finite lifetime. The term "resposables" has been given to these devices which during their useful lifetime will undergo multiple sterilization cycles.

The "fitness for use" of this type of equipment can be maintained by incorporating a means of demonstrating the degree of usage. In this way the user has a means of knowing when the "resposable" will no longer function properly and cause damage to the patient. The present invention demonstrates how the number of sterilization cycles experienced by the "resposable" can be measured, which by inference informs the user the degree of service the device has had.

Many prior art TTI devices have been designed for the low temperature conditions (−20° C. to +10° C.) associated with the safe storage of food. A low temperature TTI device incorporating a paper carrier, or wick, is described by U.S. Pat. No. 4,038,873. It discloses a device based on a diffusing medium that liquefies at or above a predetermined temperature.

The liquified diffusing medium is supported by a paper carrier which it impregnates when the TTI is "activated" or made ready for use. Immediately after "activation" the TTI is rapidly brought below the temperature that it is designed to monitor. In this way the liquid in the wick solidifies and no longer functions as a carrier for the indicating material. Failure to rapidly solidify the liquid "keeps the clock running" and leads to false interpretation of the signal.

The indicating material is a dye composition capable of diffusing through the paper-supported diffusing medium, when it liquifies, at a temperature in the range it is designed to monitor.

Another TTI requiring activation is disclosed in U.S. Pat. No. 5,120,137 which describes a reservoir containing an indicating material that liquifies at or above a predetermined temperature. The reservoir is mounted on a base sheet, and a removable barrier is interposed between the reservoir and a wick of very fine interconnected fibers. Removing the barrier activates the TTI by placing the wick in contact with the reservoir, thereby enabling the migration of the indicating material along the wick at a controlled rate upon liquification.

There exists a need for a TTI that does not need to be "activated" but is ready for use without user intervention.

A TTI not requiring activation is disclosed by U.S. Pat. No. 4 448,548. It is designed for the temperature region used in steam sterilization of medical devices (121° C. to 134° C.) and its functionality is based on the liquification of a contained pellet of fusible material and its subsequent movement in a paper wick. Despite having a large size and a long wick (about 2 inches) the device is capable of indicating just one sterilization cycle. The device is incapable of indicating the multiplicity of sterilization cycles that a reuseable medical will undergo.

One deficiency of wick-based indicators is that for a wick to function effectively, i.e., as an absorbant medium for a fusible pellet of material, it must be of a size that is often too large for facile attachment to re-sterilizable medical devices. There exists a need for steam sterilization TTI devices that may be attached to, or be incorporated directly into the body of the reusable medical device. As will be disclosed below this may be accomplished by eliminating fusible materials and the porous wick.

There exists a need for TTI's, without fusible materials and absorbant wicks, that can reliably indicate and differentiate between the time elements corresponding to as few as one and as many as 100 high temperature sterilization cycles. The intended temperature range for these devices lies between 100° C. and 160° C.

SUMMARY OF THE INVENTION

It has now been discovered that certain polymer-dye combinations yield temperature mediated diffusion rates of the dye, within the continuous polymer structure, which allow the construction of TTI's that meet the unfilled needs described above.

The selection of the polymer-dye combination will be influenced by (1) the temperature profile of the sterilization process; (2) the thermomechanical properties of the polymer; (3) visual properties of the polymer; (4) the chemical compatibility of the dye with the chosen polymer and (5) intrinsic properties of the dye including molecular weight, molar extinction coefficient, and purity.

When the polymer-dye combination is well chosen, progressive and visual movement of the dye will take place when the TTI is within a narrow temperature range which includes the region where sterilization of the medical device occurs. Conversely, when the temperature of the TTI is below the sterilization temperature range, the movement of the dye will be significantly retarded. Most importantly, when the TTI is stored at normal ambient conditions (21° C.–35° C.) movement of the dye will virtually cease.

This discovery can be adapted to provide a TTI device capable of recording the number of sterilization cycles experienced by the device. The present invention eliminates the need for fusible materials, wicks, porous carriers and the like, so that the TTI's disclosed herein can be a size suitable for incorporation into the body of medical device. When thus incorporated the TTI will record the time elements corresponding to the number of sterilization cycles a device experiences, when that number ranges from zero to 100.

Therefore, in accordance with the present invention, there is provided a TTI device for recording a predetermined length of time over which the TTI has been maintained above a predetermined temperature which includes the temperatures encountered in steam autoclaves, chemical sterilizers, and dry-heat ovens during the sterilization of medical devices. The time-temperature indicator device includes:

(1) a dye-compatible polymer composition having a softening point at about or above the predetermined temperature to be encountered; and (2) a polymer-compatible dye composition in contact with the polymer composition and present in a quantity sufficient for diffusion through the polymer composition whenever the polymer composition is above the predetermined temperature, which quantity is selected so that the extent of diffusion corresponds to the duration of exposure above the predetermined temperature relative to the total time required for substantially complete diffusion.

When these conditions are met the TTI provides a progressive, irreversible marking of the polymer composition which serves as a permanent record of the duration of time the indicator device is exposed to temperatures in a predetermined temperature range such as a sterilization temperature range.

The present invention provides a simple, reliable TTI, small in size and easily incorporated in the body of a medical device requiring sterilization for as few as one, and as many as 100 repetitions.

The TTI's of the present invention may also be utilized in methods for recording a duration of time over which a temperature in excess of a predetermined temperature has been endured.

Methods in accordance with the present invention include the steps of: (1) providing the TTI device of the present invention, described above; (2) exposing the TTI to a temperature above the predetermined temperature so that the dye composition diffuses into the polymer composition; and (3) evaluating the extent of diffusion of the dye composition through the polymer composition to determine the duration of time the device was exposed above the predetermined temperature, wherein the extent of diffusion corresponds to the duration of exposure above the predetermined temperature relative to the total time required for substantially complete diffusion.

The method of the present invention may be used to evaluate single or multiple exposures of the indicator devices to temperatures in excess of the predetermined temperature. In either end-use application, the method will provide a reliable record of the time-temperature history above a predetermined temperature experienced by the indicator devices of the present invention.

While indicator devices in accordance with the present invention can be prepared for recording heat histories over a wide range of temperatures, the present invention is particularly well suited for the preparation of thermal sterilization indicator devices.

Steam, chemical, and dry-heat sterilization indicator devices in accordance with the present invention function effectively at sterilization temperatures and conditions, but are nonfunctional at normal ambient and storage conditions, providing an article of great reliability. Because of their inherent simplicity, requiring only a dye composition pattern affixed to a simple form of polymer composition, such as a film, the present invention provides TTI devices that are easily and economically manufactured.

BRIEF DESCRIPTION OF THE DRAWINGS

A more complete appreciation of the invention and many other intended advantages can be readily attained by reference to the following detailed description when considered in connection with the following drawings, wherein.

It should be noted that the drawings are not necessarily to scale, but that certain elements have been expanded to show more clearly the various aspects of the present invention and their advantages.

DETAILED DESCRIPTION OF THE PREFERRED EMBODIMENT

The TTI devices of the present invention, in their simplest form, consist of a dye-compatible polymer composition having a softening point at about or above the predetermined temperature above which a heat history is to be recorded. The polymer composition is in contact with a dye composition capable of diffusing therethrough, at a controlled rate, as a function of temperature. For optimum results, the polymer composition is in the form of a film or coating in contact with a printed pattern of the dye composition.

The dye composition may be printed or otherwise applied to the device for which the heat history is to be recorded, with the polymer composition film or coating applied directly thereover. Alternatively, the dye composition may be printed or otherwise applied, directly or indirectly, to the film or coating of the polymer composition, which may be subsequently affixed or otherwise used in combination with the device for which the heat history is to be recorded.

In another form of the present invention, the dye composition may be printed or otherwise applied to paper, cloth or other suitable support over which a film or coating of the polymer composition is layered to bring into contact the dye composition and polymer composition. This laminate may then be incorporated, affixed to, or otherwise used in combination with an article for which a heat history is to be recorded. This embodiment of the invention differs from prior art devices, using wicks or other porous carriers, on the basis that the support to which the dye composition is applied is inert in function. The dye composition does not advance through the support, but diffuses into the polymer instead.

The requirements of the present invention are that dye diffusion within the polymer be primarily temperature dependent, so that at temperatures (1) below the region of intended use dye diffusion virtually ceases; whereas (2) in the temperature region of intended use the rate of diffusion is sufficient to provide measurable differences in the extent of diffusion as a function of time of exposure to, for example, a multiple of normal sterilization cycle times.

Polymers suitable for use with the present invention include ethylene vinyl acetate, polyesters, polyethylene, polyethylene/ethylene acrylic acid, low density polyethylene, polypropylene, polystyrene, polyvinyl chloride and polyvinylidine chloride. In a preferred embodiment of the present invention, crosslinked analogs of polymers having melt temperatures or melting points above the temperature to be monitored are employed. Such crosslinking renders the polymer thermosetting and therefore non-fluid at or above the polymer melting point. This permits the use of polymers that would ordinarily be liquid at the predetermined temperature. To be suitable for use with the present invention, a crosslinked thermosetting polymer must not thermally decompose at a temperature within the heat history to be experienced by the polymer composition.

One group of crosslinked thermosetting polymers well suited for use with the present invention is the heat-shrinkable polyolefins. Heat-shrinkable, cross-linked polyolefins are available having melting points suitable for monitoring steam sterilization conditions (121° C. to 134° C.). Examples of commercially available heat-shrinkable polyolefins are SR350, manufactured by 3M and RNF 100, a product of Raychem. Thus, polymers suitable for use in the present invention include heat-shrinkable polyethylene and polypropylene. Other heat-shrinkable polymers suitable for use in the present invention include heat shrinkable ethylene vinyl acetate, polyesters, polyethylene/ethylene acrylic acid copolymers, low density polyethylene, polystyrene, polyvinyl chloride and polyvinylidine chloride.

Depending upon the end-use requirements, the polymer may be utilized in its unmodified state, or it may optionally contain amounts up to 15 percent based on the weight of the polymer of art-recognized additives such as one or more blend-compatible polymers, pigments, reinforcing fillers, stabilizers, antidegradants, antioxidants, processing aids, adhesives, plasticizers, and the like. For this reason, the polymer component of the present invention is referred to as a polymer composition. The polymer composition must not contain levels of pigments or hiding compositions that would obscure observation of the diffusion of the dye composition therethrough.

As will be readily appreciated, selection of a polymer composition for a given end-use application will depend upon the softening point of the polymer composition. The softening point of the polymer composition should be as close as practical to the predetermined temperature to be monitored. In other words, the softening point of the polymer composition should be at about the predetermined temperature to be monitored. Suitable polymer compositions will have softening points up to about 20° C. above, but no more than 5° C. below, the predetermined temperature to be monitored. As is well understood by those of ordinary skill in the art, polymer composition softening points are determined by the procedures defined by ASTM-D2398, the particulars of which are incorporated herein by reference thereto.

Polymer compositions having softening points up to about 15° C. above the predetermined temperature are preferred and polymer compositions having softening points up to about 1° C. above the predetermined temperature are even more preferred. In preferred compositions, the polymer composition softening point is no more than 1° C. above the predetermined temperature to be monitored. For example, for steam sterilization at 134° C., cross-linked polypropylene having a softening point of 135° C. is a preferred polymer.

The present invention is particularly useful for monitoring exposure to various sterilization conditions, including saturated steam at 15 psig and 121° C., saturated steam at 27 psig and 134° C. and dry heat at 160° C. Thus, a polymer composition having a softening point between about 116° C. and 151° C. is suitable for use in indicator devices to be exposed to saturated steam at 15 psi and 121° C. A polymer composition having a softening point between about 129° C. and about 164° C. is suitable for use with indicator devices to be exposed to saturated steam at 27 psig and 134° C.

Polymer compositions having softening points between about 155° C. and about 190° C. are suitable for use in indicator devices to be exposed to dry heat at 160° C.

The polymer composition component for the indicator devices of the present invention can be formed directly from the resulting blend or die-cut from films or coatings formed therefrom. As such, the polymer compositions of the present invention can be directly extruded, calendered, compression-molded, injection-molded, thermoformed or otherwise cast, by conventional solvent-free methods well-known to those of ordinary skill in the art.

The present invention contemplates forming polymer composition components consisting of pure polymer essentially free of any additives. Therefore, the above-described techniques for forming the polymer composition component may be applied to an essentially pure base polymer that has not been compounded with any additives.

The dye composition component of the present invention may be formulated with any of various known polymer-compatible organic dyes. Essentially any organic dye capable of diffusing into a dye-compatible polymer at temperatures below the polymer softening point is suitable for use with the present invention. The present invention is universally applicable to essentially any polymer-compatible dye. Solvent dyes are typically used.

The dye composition component of the present invention is preferably compounded into an ink or coating composition. The ink or coating composition should contain one or more dye compounds capable of diffusion into the polymer composition within a temperature range defined by the predetermined temperature to be monitored and the predetermined temperature. Suitable dye compounds include: non-ionic azo or diazo dyes, anthaquinone and carbonyl dyes.

Indicator devices for use in medical or food related areas should contain non-toxic dye compounds. For the sterilization end-uses previously described, oil-soluble D&C dyes are preferred. Examples of such dyes are D&C Red #17, D&C Green #6, D&C Violet #2, D&C Yellow #11, and D&C Green #6.

The dye compound-containing ink and coating compositions which serve as the dye composition component of the present invention also include various conventional additives for ink and coating compositions. Examples of suitable conventional additives include solvents, surfactants, releasing agents, carriers, lubricants, extenders, biocides, drying agents, dispersing agents, defoamers, rheology and viscosity modifiers, and the like.

Such additives are generally present in amounts between about 60 and about 99 percent by total weight and preferably in amounts between about 80 and about 95 percent by total weight.

The dye-compound containing ink or coating compositions of the present invention are prepared by conventional methods, using any art-recognized method for compounding an ink or coating composition. Typically a dispersion of the dye compound and any additives is milled with size-reducing media such as stones or sand, until a fine and uniform composition is obtained.

The dye composition is then placed in contact with the polymer composition. The amount of dye composition required is such that the rate of diffusion of the dye composition in the polymer composition will be finite and controllable.

The proper quantity of dye to be employed can be readily determined by one of ordinary skill in the art without undue experimentation. Typically, an amount of the dye composition between about 1 and about 10 mg per cc of the polymer composition is suitable for use with the present invention, with a quantity between about 2 and about 9 mg per cc being more preferred, and a quantity between about 3 and about 8 mg per cc being most preferred.

Migration of the dye composition through the polymer composition will be at a predictable rate provided that the initial concentration of the dye composition is not less than 1 mg per cc of the polymer composition. The extent of progressive coloration corresponds to the duration of time, and the proximity to the predetermined temperature, that the polymer composition resides.

The concentration gradient provides a record of the duration of time the polymer composition is exposed to temperatures above a predetermined temperature. The extent of the progression of the gradient can be readily calibrated to correspond with time intervals by one of ordinary skill in the art without much effort, so that evaluation of the progression of the gradient can readily establish the duration of time the polymer composition was exposed to temperatures proximate to the predetermined temperature.

The present invention contemplates an endless variety of means by which dye compositions may be brought into contact with polymer compositions to form the TTI devices of the present invention. For example, the dye compositions of the present invention may be directly applied to the article, the heat history of which is to be monitored, such as a medical device for which the number of sterilization cycles is to be recorded. The dye composition is preferably applied in a pattern that draws attention to the TTI device.

The formation of a pattern, as well as the metering of the desired quantity of the dye composition can be achieved with many different methods of printing, such as silk screening, pad printing, thermal transfer printing and many others. The same printing methods can also be used to apply a non-diffusable pattern such as indexing lines or reference marks corresponding to time intervals, if desired. These indexing lines or reference marks form what is defined as the visualizing area of the device, wherein progressive coloration of the polymer composition may be observed.

Dye diffusion occurs more rapidly as temperatures increase. Those of ordinary skill in the art will understand how to control the geometry of either or both of the dye pattern and the non-diffusable indexing lines to compensate for different temperature conditions.

The polymer composition may then be directly applied to the medical device in a film or coating covering the dye composition pattern utilizing one of the above-described techniques for forming the polymer compositions of the present invention, i.e., extruding, calendering, etc.

In a preferred embodiment, the dye composition of the present invention is printed on an article in the form of parallel lines. The duration of temperature exposure above the predetermined temperature is indicated by the degree of convergence of the lines. By altering the thickness and distance between lines, the length of time required for convergence of the lines can be controlled. Extremely fine control of these parameters can be obtained by using commercially available computer graphics programs. A film or coating of the polymer composition is then layered over the dye composition to provide an article having a TTI device as an integral part of the article.

The present invention contemplates both the formation of TTI devices as integral parts of articles during assembly processes, as well as the preparation of TTI devices that can be subsequently affixed or used in combination with an article for which the heat history is to be recorded.

The latter devices are typically prepared by forming the TTI device on the surface of a suitable support, such as paper, cloth, plastic film, or metal foil. This is accomplished by printing the dye composition on the surface of the support and then covering the dye composition pattern with a coating or film layer of the polymer composition. For TTI devices that are to be affixed to articles for which a heat history is to be recorded, the dye-composition printed support may be first affixed to the article, followed by covering the dye composition pattern with the polymer composition. Alternatively, the dye-pattern printed on the support may first be covered with the film or coating of the polymer composition before affixing the support to the article.

Support-based TTI devices are preferably affixed to articles by means of an adhesive layer on the surface of the support opposite the surface covered by the TTI device. In a preferred embodiment, a pressure-sensitive adhesive label is printed with a dye composition pattern which is then covered by a film or coating layer of the polymer composition. The pressure sensitive label may then be affixed to a device, the temperature history of which is to be monitored.

In either embodiment of the invention in which the TTI device is formed directly on an article or layered on a support that is subsequently affixed or used in combination with an article, the dye composition pattern need not be directly printed or otherwise formed on the article or support. Instead, the dye composition can be printed on a film or coating of the polymer composition, which is then layered pattern-side-down on the article or support to form a combination equivalent in structure to the above-described embodiments.

In a particularly preferred embodiment of the present invention, heat shrinkable plastic tubes are utilized to apply the polymer composition to cylinder-shaped articles. For example, a laprascopic surgical device is either directly printed with a dye composition pattern or has a label affixed thereto printed with a dye composition pattern. A sleeve of a heat-shrinkable polyolefin tube is then slipped over the shaft of the device containing the dye composition pattern. The sleeve is heated so that it shrinks to form a film of the polymer composition around the dye composition pattern.

Figure 1:
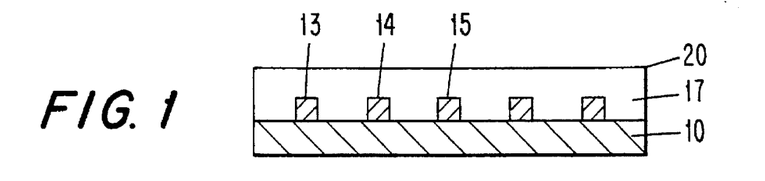
FIGS. 1–1c show side, cross-sectional views of a device according to the present invention.

According to a preferred embodiment of the present invention, FIG. 1 depicts a medical device 10 having a dye composition pattern 12 printed thereon in the form of indicating lines 13, 14 and 15. The dye composition pattern is coated with polymer film layer 17, thereby forming TTI device 20. In the depicted example, the polymer film layer 17 has a softening point of 135° C. so that the TTI device 20 records the number of sterilization cycles at or above 121° C. experienced by the medical device 10.

Figure 1A:
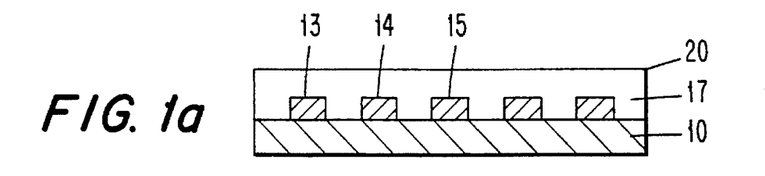
Figure 1B:
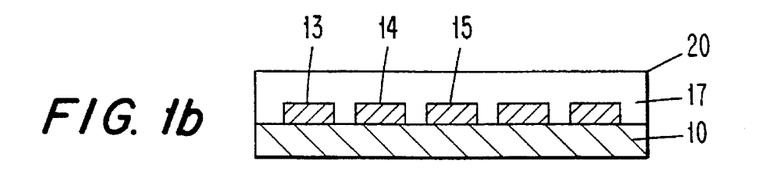
Figure 1C:
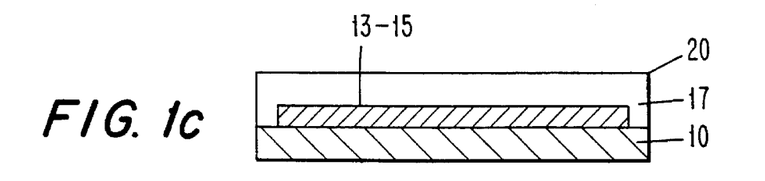

In the examples shown, the duration of temperature exposure above 121° C., which corresponds to the number of sterilization cycles experienced, is indicated by the degree of convergence of the lines, 13, 14 and 15 in a direction perpendicular to the thickness of polymer film layer 17. FIG. 1a depicts the combination of FIG. 1 after three sterilization cycles. FIG. 1b depicts the combination of FIG. 1 after seven sterilization cycles. FIG. 1c depicts the combination of FIG. 1 after ten sterilization cycles, at which point the medical device 10 should be discarded.

Figure 2:
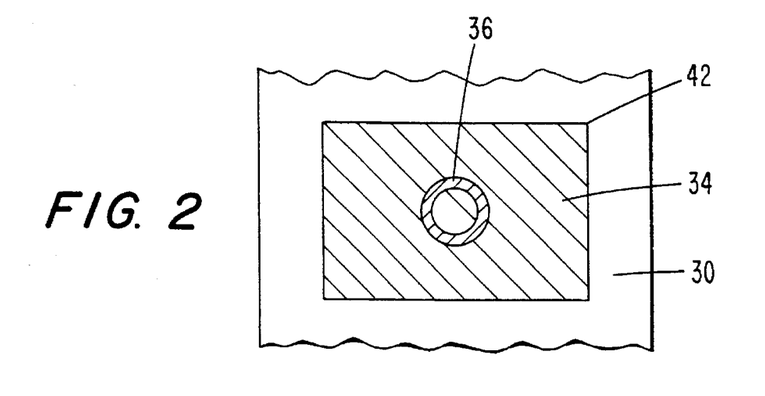
FIG. 2 shows a top view of a related embodiment of the present invention.
Figure 3:
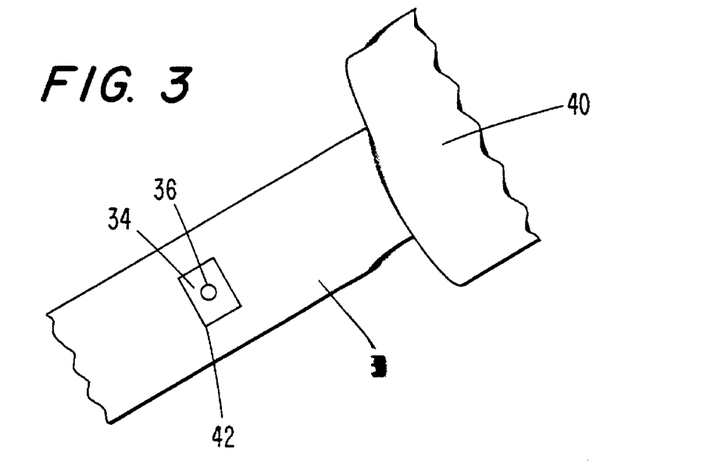
FIG. 3 shows an exploded, perspective view of the embodiment of FIG. 2.
Figure 4:
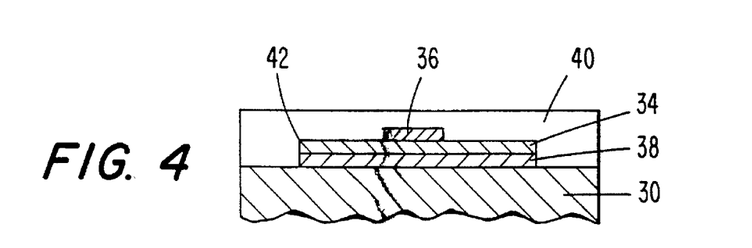
FIG. 4 shows a side, cross-sectional view of the embodiment of FIG. 2.

Another preferred embodiment of the invention is depicted in FIG. 2. Label 34 is printed with dye composition pattern 36 in the form of a circle. The label is affixed to medical device 30 by an adhesive layer (not shown). Heat-shrinkable tubing sleeve 40 is slipped over label 34 as shown in an exploded, perspective view in FIG. 3. Heating the tubing sleeve 40 causes it to shrink to form a polymer film layer over the label 34 printed with pattern 36, as shown in the side perspective in FIG. 4 in which adhesive layer 38 is shown.

Figure 5A:
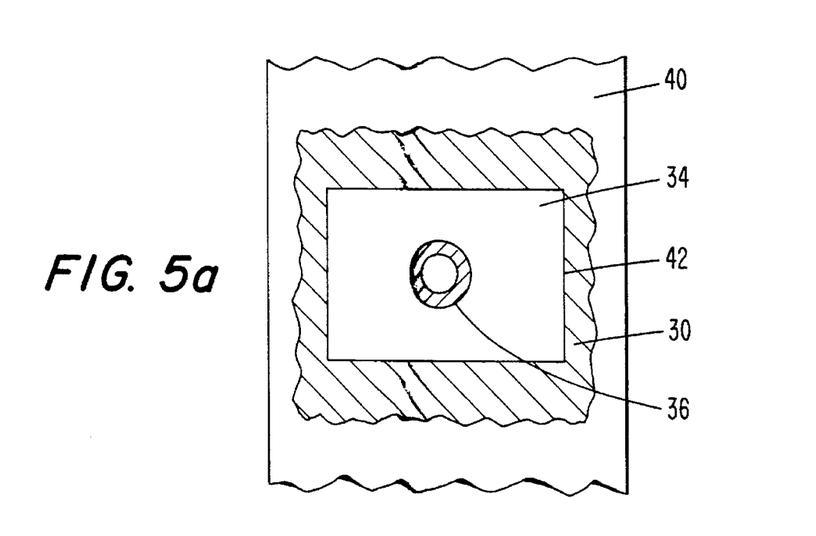
FIGS. 5a–5c show top, partially torn away views of the embodiment of FIG. 4 showing the polymer film layer thereof.
Figure 5B:
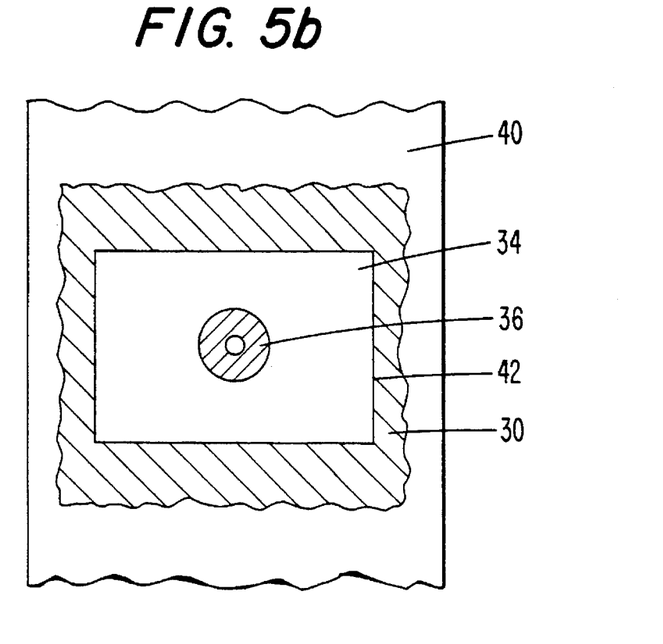
Figure 5C:
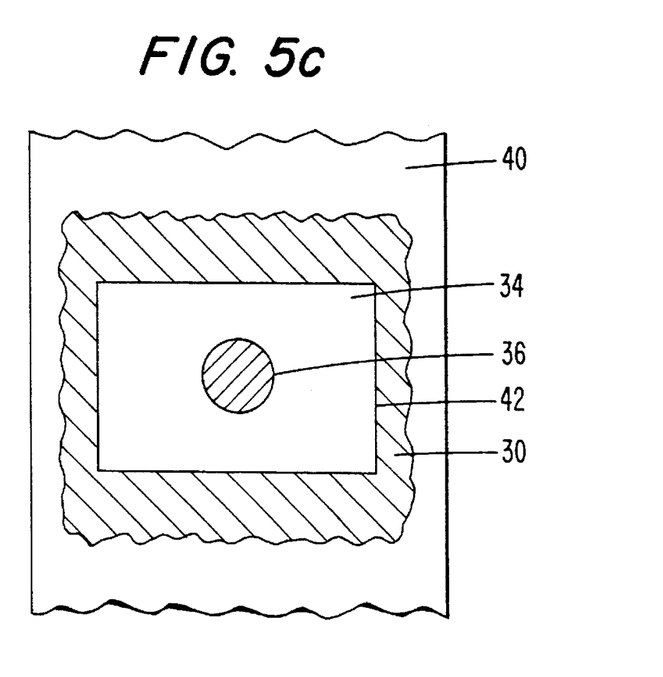

The polymer from which the heat-shrinkable tubing has been formed has a softening point of 135° C., so that the TTI device 42 also records the number of sterilization cycles experienced by medical device 30. In the depicted embodiment, the duration of temperature exposure above 121° C. is indicated by the extent to which the center of the "O" pattern 36 has become filled-in. FIG. 5a is a top view depicting the combination of FIG. 4 after one sterilization cycle. FIG. 5b depicts three sterilization cycles. FIG. 5c depicts seven sterilization cycles, at which point the medical device 30 should be discarded.

The indicator devices of the present invention are used to record the duration of time over which a temperature has been established above a predetermined temperature by exposing the devices above the predetermined temperature so that the dye composition diffuses through the polymer composition. The progressive coloration of the polymer composition is then evaluated to determine the duration of time the device was exposed above the predetermined temperature. The extent of progressive coloration corresponds to the duration of time, and the proximity to the predetermined temperature, and is a function of the total time required for complete diffusion of the dye composition through the polymer composition.

Methods in accordance with the present invention for recording the duration of time above a predetermined temperature preferably include the step of cooling the device below the predetermined temperature before evaluating the progressive coloration of the polymer composition.

The method of the present invention may be used to record the duration of a single heating of the indicator device above the predetermined temperature, as well as to record the total duration of multiple heatings and coolings of the indicator device above and below the predetermined temperature.

Therefore, preferred methods in accordance with the present invention repeat the steps of heating and cooling the indicator device and evaluating the progressive coloration of the polymer composition. The heating, cooling and evaluating steps are preferably repeated until the dye composition completely diffuses through the indexed area of the polymer composition. For reusable medical devices having a finite lifetime, this typically indicates that the device should be discarded.

The following examples illustrate particular conditions, steps and materials within the scope of this invention, it being understood that these examples are given only by way of illustration and not limitation.

EXAMPLE 1

AFFECT OF TIME, TEMPERATURE AND DYE CONCENTRATION IN CLOSING A CIRCLE

A pressure-sensitive acrylic adhesive backed Kimdura label secured from Diagraph Industries, Chicago, Ill., was printed with a Prodigy 1 thermal printer. The printing ribbon contained D&C Red #17, an oil-soluble dye at a dye composition of approximately 1.25 g/m². It was used to print solid squares of color, 12.6 mm on a side. From the center of this solid square was punched a hole 3.175 mm in diameter.

This label was then attached to a metal bar 5.3 mm in diameter. Over this was slipped a 20 mm length of 9.5 mm diameter heatshrinkable tubing (SR350, a product of 3M, St. Paul, Minn.). The tubing was heated with a heat gun to shrink and thereby secure it to the label as a coating layered over the printed pattern.

Two bars were subject to the same construction. When viewed, the label construction gave the appearance of a light colored circle surrounded by a field of red. Another two bars were prepared in the same manner using a ribbon with a higher concentration of dye, approximately 2.83 g/m² of ribbon.

The four bars were then thermostatted for various lengths in time, at two temperatures associated with the steam sterilization of medical devices, 250° F. and 273° F. Visually, the light colored circles appear to gradually "shrink" as dye from the surrounding field diffused into the clear area. The darkening of the circular area was evaluated instrumentally using a Macbeth Model 1235 Reflecting Densitometer. As the reflecting area became occluded by diffusing dye, the amount of reflected light decreased and the numerical instrumental reading increased. The results are shown below.

TABLE 1

REFLECTANCE VALUES AS A FUNCTION OF TIME AND TEMPERATURE D&C RED 17

| Minutes @ Temperature | 250° F. | 250° F. | 273° F. | 273° F. |
| --- | --- | --- | --- | --- |
| Dye Conc.→ | 1.25 g/m² | 2.83 g/m² | 1.25 g/m² | 2.83 g/m² |
| 0 | .445 | .445 | .445 | .445 |
| 3 | | | .52 | .54 |
| 5 | | | .55 | .56 |
| 10 | .59 | .58 | .60 | .64 |
| 20 | .60 | .72 | .83 | 1.24 |
| 40 | .79 | | | |

The data demonstrates that the visual disappearance of the light colored circle can differentiate the time and temperature of exposure. The rate of closing of the circle is increased by higher temperature and higher dye concentration.

EXAMPLE 2

USE OF D&C VIOLET #2 AND PAPER SUBSTRATE

To demonstrate that dyes other than D&C Red 17 may be used, similar experiments were performed using D&C Violet #2. Although most of the prints were made on the Kimdura stock several measurements were made using paper as the printing stock. The response of those indicators was consistent with that obtained using Kimdura.

TABLE 2

REFLECTANCE VALUES OF D&C VIOLET #2 AT 273° F.

| Minutes @ 273° F. | Reflectance | Stock |
| --- | --- | --- |
| 0 | 0.48 | Kimdura |
| 4 | 0.59 | Kimdura |
| 8 | 0.76 | Kimdura |
| 10 | 0.81 | Paper |
| 12 | 0.82 | Kimdura |

TABLE 2-continued

REFLECTANCE VALUES OF D&C VIOLET #2 AT 273° F.

| Minutes @ 273° F. | Reflectance | Stock |
|---|---|---|
| 18 | 1.12 | Kimdura |
| 20 | 1.21 | Paper |
| 30 | 1.38/1.42 | Kimdura/Paper |

EXAMPLE 3

DETERMINATION OF THE ONSET TEMPERATURE

Although it is desirable that the rate of migration be a function of temperature, it is also necessary that there be a point at which migration stops. Without this property, indicators stored below the temperature they are designed to operate at would gradually give an indication, in spite of the fact that they had not been exposed to the temperatures at which they are designed to monitor exposure times.

The following Table shows the Time, Temperature, and Reflectance Values for D&# Violet #2, at the point where there is the first discernable decrease in reflectance.

TABLE 3

DETERMINATION OF ONSET TEMPERATURE; THE TEMPERATURE BELOW WHICH DIFFUSION IS VANISHINGLY SLOW

| Temperature (°F.) | Time/Units | Reflectance |
|---|---|---|
| 273 | 5 minutes | 0.53 |
| 250 | 20 minutes | 0.56 |
| 200 | 2 hours | 0.53 |
| 120 | 4 days | 0.59 |
| 120 | 7 days | 0.55 |
| 120 | 21 days | 0.59 |

Notes:
Starting reflectance value 0.49; fully signaled value 1.40.

In the examples at 120° F. the polymer itself becomes darker over the extended time period of the test. The constancy of the value between 4 and 21 days is evidence that the indicator can be safely stored at temperatures of 120° F., or less.

EXAMPLE 4

DEMONSTRATING ALTERNATE GEOMETRY FOR THE INDICATOR

White, pressure-sensitive adhesive backed paper labels were printed by the thermal transfer method with D&C Red #17. The printed patterns were "reverses" or "negatives" of varying design. In other words, when a letter such as "O" was printed, it appeared white inside a red field.

The label was affixed to a laprascopic cutting tool and over-wrapped with SR350 heat-shrinkable HDPE tubing as in Example 1. When subject to sterilization conditions, the sharply printed characters blurred because of the diffusion of the ink into the overwrap. The characters became progressively blurred, until such time as the diffusing ink filled in the white spaces. The maximum number of sterilization cycles for the laprascopic tool corresponded to the length of time required for diffusion to completely fill in the white portions of characters.

EXAMPLE 5

Example 4 was repeated, printing "positive," rather than "negative" images of the various text and graphic characters. The degree to which the characters blurred corresponded to the number of sterilization cycles to which the laprascopic tool was exposed.

As will be readily appreciated, numerous variations and combinations of the features set forth above can be utilized without departing from the present invention as set forth in the claims. Such variations are not to be regarded as a departure from the spirit and scope of the invention, and all such modifications are intended to be included within the scope of the following claims.

What is claimed is:

1. A time-temperature indicator device for recording the duration of time over which a temperature has been established above a predetermined temperature, comprising:

a dye-compatible polymer composition having a softening point at or above said predetermined temperature and said polymer composition being in the form of a film or coating layer having top and bottom surfaces and a predetermined thickness; and a polymer-compatible dye composition in contact with one of said surfaces of said polymer composition, wherein said dye composition is present in a quantity sufficient for diffusion through said polymer composition whenever said polymer composition is above said predetermined temperature, which quantity is selected so that the extent of said diffusion within said polymer composition corresponds to the duration of exposure above said predetermined temperature, and with the diffusion of the dye within the polymer composition being perpendicular to said predetermined thickness.

2. The indicator device of claim 1, wherein said dye composition comprises an oil-soluble D&C dye selected from the group consisting of D&C Red #17, D&C Green #6, D&C Violet #2, D&C Yellow #11, D&C Red #27, D&C Citrus Red #2 and Copper Phthalocyanine.

3. The indicator device of claim 1, wherein said polymer composition has a softening point no more than about 30° C. above said predetermined temperature.

4. The indicator device of claim 3, wherein said polymer composition has a softening point no more than about 15° C. above said predetermined temperature.

5. The indicator device of claim 4, wherein said polymer composition has a softening point no more than about 1° C. above said predetermined temperature.

6. The indicator device of claim 1, wherein said polymer composition comprises a heat-shrinkable crosslinked polymer.

7. The indicator device of claim 1, wherein said polymer composition comprises a polymer selected from the group consisting of ethylene-vinyl acetate, polyester, polyethylene, polyethylene/ethylene acrylic acid, low density polyethylene, polypropylene, polystyrene, polyvinyl chloride and polyvinylidiene chloride.

8. The indicator device of claim 7, wherein said polymers comprise heat-shrinkable crosslinked polymers.

9. The indicator device of claim 1, comprising between about 1 and about 10 mg of said dye composition per cc of said polymer composition.

10. The indicator device of claim 9, comprising between about 2 and about 9 mg of said dye composition per cc of said polymer composition.

11. The indicator device of claim 10, comprising between about 3 and about 8 mg of said dye composition per cc of said polymer composition.

12. The indicator device of claim 1, wherein the dye composition is applied in the form of indicating lines.

13. The indicator device of claim 1, wherein the dye composition is applied in the form of a circle.

14. A method for recording a duration of time over which a temperature has been established above a predetermined temperature, comprising the steps of:

providing a time-temperature indicator device comprising a dye-compatible polymer composition having a softening point at or above said predetermined temperature an said polymer composition being in the form of a film or coating layer having top and bottom surfaces and a predetermine thickness; and a polymer-compatible dye composition in contact with one of said surfaces of said polymer composition, wherein said dye composition is present in a quantity sufficient for diffusion through said polymer composition whenever said polymer composition is above said predetermined temperature, which quantity is selected so that the extent of said diffusion within said polymer composition corresponds to the duration of exposure above said predetermined temperature relative to the total time required for substantially complete diffusion through said polymer composition, and with the diffusion of the dye within the polymer composition being perpendicular to said predetermined thickness;

exposing said device above said predetermined temperature so that said dye composition diffuses through said polymer composition; and evaluating said extent of diffusion of said dye composition within said polymer composition to determine the duration of time said device was exposed above said predetermined temperature.

15. The method of claim 14, further comprising the step of cooling said device below said predetermined temperature before said step of evaluating said extent of diffusion of said dye composition through the said polymer composition.

16. The method of claim 15, further comprising repeating said steps of heating and cooling said indicator device and evaluating a progressive coloration of said polymer composition.

17. The method of claim 16, wherein said steps of heating and cooling said indicator device and evaluating said progressive coloration are repeated until said dye composition substantially completely diffuses through the visualizing area of said device.

18. The method of claim 14, wherein said dye composition comprises an oil-soluble D&C dye selected from the group consisting of D&C Red #17, D&C Green #6, D&C Violet #2, D&C Yellow #11, D&C Red #27, D&C Citrus Red #2 and Copper Phthalocyanine.

19. The method of claim 14, wherein said polymer composition has a softening point no more than about 30° C. above said predetermined temperature.

20. The method of claim 14, wherein said polymer composition comprises a heat-shrinkable crosslinked polymer.

21. The method of claim 14, wherein said polymer composition comprises a polymer selected from the group consisting of ethylene-vinyl acetate, polyester, polyethylene, polyethylene/ethylene acrylic acid, low density polyethylene, polypropylene, polystyrene, polyvinyl chloride and polyvinylidiene chloride.

22. The method of claim 21, wherein said polymers comprise heat-shrinkable crosslinked polymers.

23. The method of claim 14, comprising between about 1 and about 10 mg of said dye composition per cc of said polymer composition.

24. The method of claim 14, wherein the dye composition is applied in the form of indicator lines with diffusion of the dye composition within the polymer composition being such that the indicator lines converge.

25. The method of claim 14, wherein the dye is applied in the form of a circle, and with the diffusion of the dye composition within the polymer being such that the circle pattern becomes filled in.

26. An article for which a heat history above a predetermined temperature is to be recorded comprising a time-temperature indicator device which is integrally connected or affixed to the article in a manner sufficient to indicate the heat history of the article, with the time-temperature indicator device comprising a dye-compatible polymer composition having a softening point at or above said predetermined temperature and said polymer composition being in the form of a film or coating layer having top and bottom surfaces and a predetermined thickness; and a polymer-compatible dye composition in contact with one of said surfaces of said polymer composition, wherein said dye composition is present in a quantity sufficient for diffusion through said polymer composition whenever said polymer composition is above said predetermined temperature, which quantity is selected so that the extent of said diffusion within said polymer composition corresponds to the duration of exposure above said predetermined temperature, and with the diffusion of the dye within the polymer composition being perpendicular to said predetermined thickness.

27. The combination of claim 26, wherein said article is a reusable medical device having a finite lifetime.

* * * * *